G. E. NEUBERTH

Jan. 12, 1932. METHOD OF AND APPARATUS FOR WORKING METAL Re. 18,329

Original Filed April 9, 1929 8 Sheets-Sheet 1

Inventor
George E. Neuberth

By his Attorneys
Emery Booth, Varney & Whittemore

G. E. NEUBERTH

Jan. 12, 1932. METHOD OF AND APPARATUS FOR WORKING METAL Re. 18,329

Original Filed Apr 9, 1929 8 Sheets-Sheet 2

Inventor
George E. Neuberth

By his Attorneys
Emery, Booth, Varney & Whittemore

G. E. NEUBERTH
Jan. 12, 1932. METHOD OF AND APPARATUS FOR WORKING METAL Re. 18,329
Original Filed April 9, 1929 8 Sheets-Sheet 3
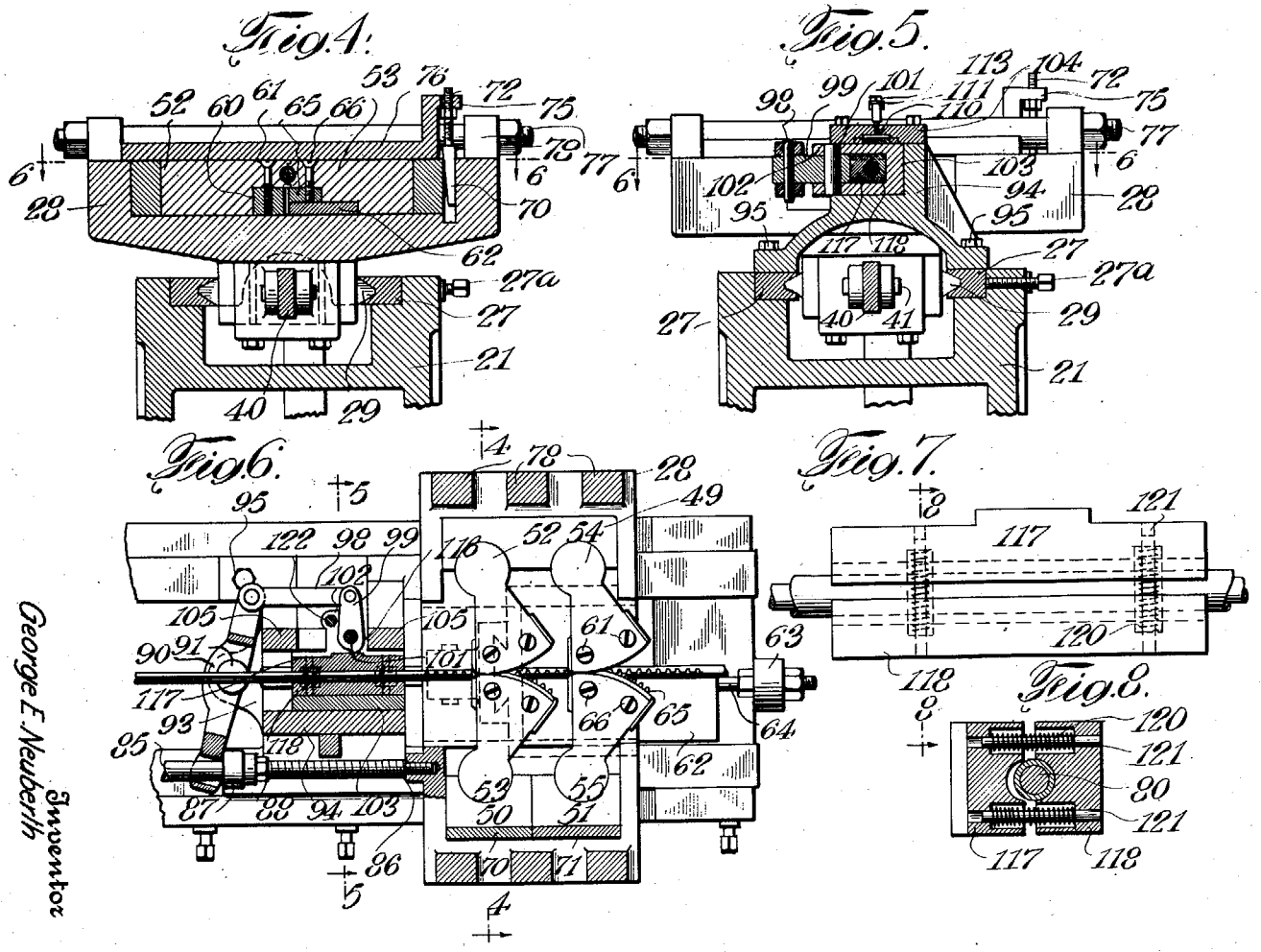
Inventor
George E. Neuberth
By his Attorneys
Emery, Booth, Varney & Whittemore

G. E. NEUBERTH

Jan. 12, 1932. METHOD OF AND APPARATUS FOR WORKING METAL Re. 18,329

Original Filed April 9, 1929 8 Sheets-Sheet 4

Inventor
George E. Neuberth

By his Attorneys
Emery, Booth, Varney & Whittemore

G. E. NEUBERTH
Jan. 12, 1932. METHOD OF AND APPARATUS FOR WORKING METAL Re. 18,329
Original Filed April 9, 1929 8 Sheets-Sheet 5
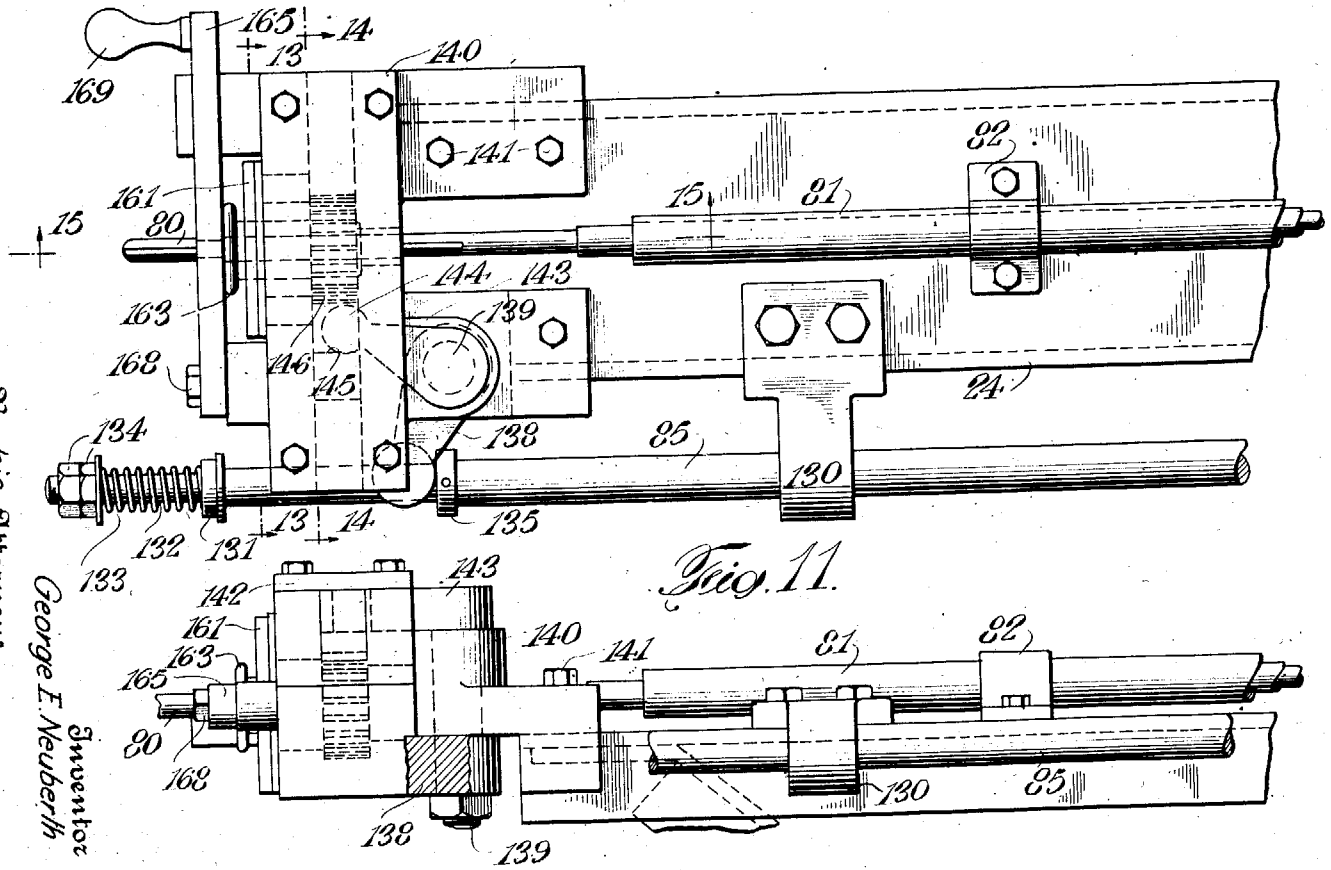
Inventor
George E. Neuberth
By his Attorneys
Emery, Booth, Varney & Whittemore G. E. NEUBERTH
Jan. 12, 1932. METHOD OF AND APPARATUS FOR WORKING METAL Re. 18,329
Original Filed April 9, 1929 8 Sheets-Sheet 6
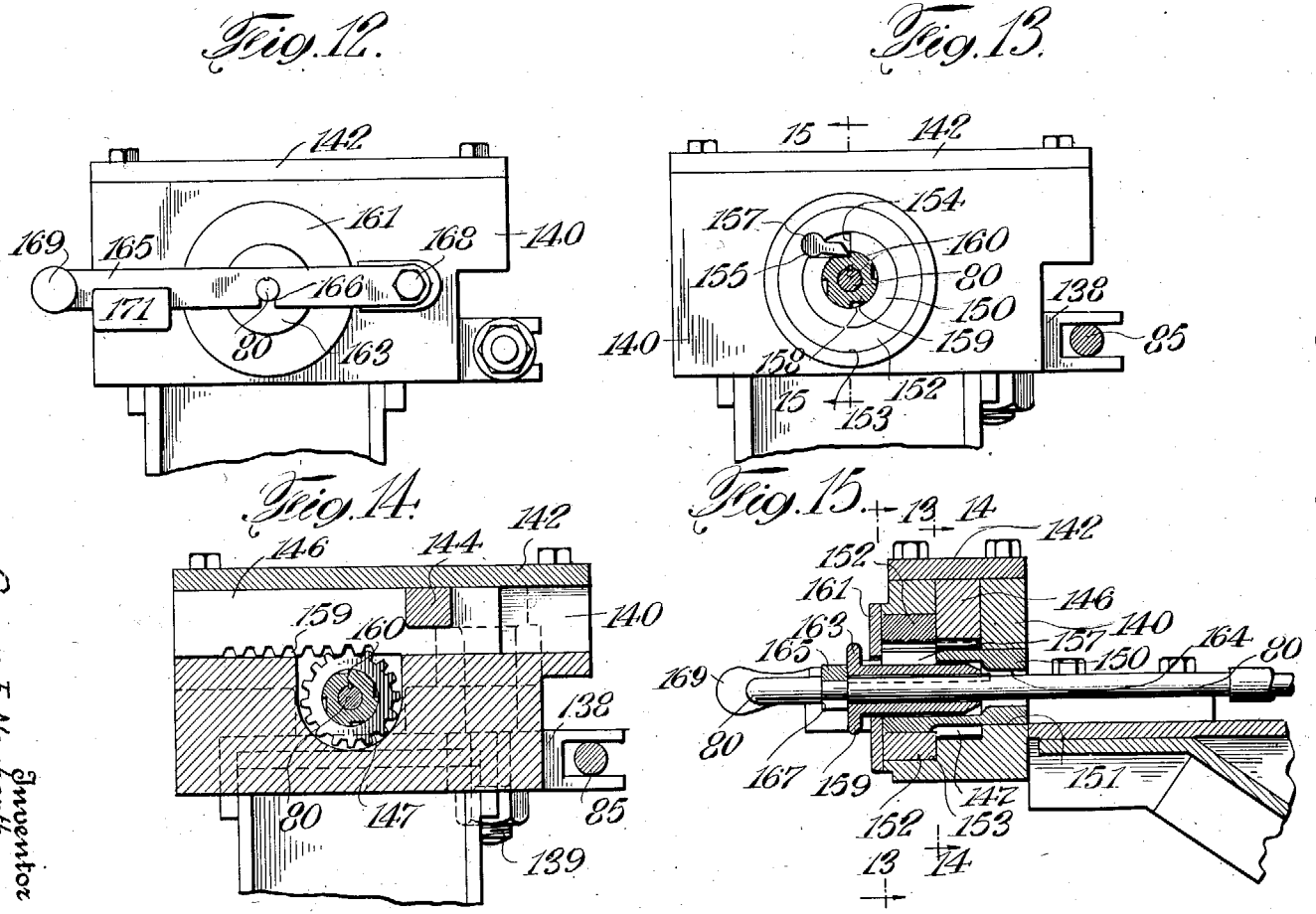
Inventor
George E. Neuberth
By his Attorneys
Emery, Booth, Varney & Whittemore

G. E. NEUBERTH

Jan. 12, 1932. METHOD OF AND APPARATUS FOR WORKING METAL Re. 18,329

Original Filed April 9, 1929 8 Sheets-Sheet 7

Inventor
George E. Neuberth
By his Attorneys
Emery, Booth, Varney & Whittemore

G. E. NEUBERTH

Jan. 12, 1932. METHOD OF AND APPARATUS FOR WORKING METAL Re. 18,329

Original Filed April 9, 1929 8 Sheets-Sheet 8

Inventor
George E. Neuberth
By his Attorneys
Emery, Booth, Varney & Whittemore

Reissued Jan. 12, 1932 Re. 18,329

UNITED STATES PATENT OFFICE

GEORGE EDWARD NEUBERTH, OF NEWARK, NEW JERSEY, ASSIGNOR, BY MESNE ASSIGNMENTS, TO TUBE REDUCING CORPORATION, OF WILMINGTON, DELAWARE, A CORPORATION OF DELAWARE

METHOD OF AND APPARATUS FOR WORKING METAL

Original No. 1,810,886, dated June 16, 1931, Serial No. 353,717, filed April 9, 1929. Application for reissue filed December 5, 1931. Serial No. 579,306.

The present invention relates to a method of and apparatus for working metal, whereby the cross-sectional area of the stock acted upon is reduced with an accompanying elongation of the stock; the object of the invention being to provide method and apparatus whereby the desired results may be accomplished in a practicable and efficient manner without excessive strain upon the metal.

This application is a continuation in part of my copending applications, Serial Number 229,887, filed October 31st, 1927, Serial Number 280,466, filed May 25, 1928, and Serial Number 320,373, filed November 19th, 1928.

The invention may find its most general application to the reduction of tubular stock and, therefore, a preferred embodiment of the invention particularly adapted for the reduction of tubes has been selected for purposes of illustration and description herein. This illustrative embodiment of the invention is adapted to effect either a substantial reduction in the wall thickness of tubes with slight reduction in diameter, or to effect a substantial reduction in diameter with little or no reduction in wall thickness, or to effect simultaneously a reduction in wall thickness and a reduction in diameter in such proportions as may be desired. Other adaptations of the invention will be apparent to those skilled in the art to which the invention relates.

There are a number of commercially available processes for the manufacture of tubes having relatively large diameter or relatively thick walls or both. Such processes are generally practiced upon metal heated to a relatively high temperature. Seamless tubes may thus be made of various metals and alloys, while tubes having a longitudinal seam of one sort or another may also be made but of a more limited number of metals and alloys. Finished tubes of accurate dimension, as well as tubes of relatively small diameter and tubes having relatively thin walls, are generally produced by the reduction of larger or heavier walled tubes.

There are but few reducing processes which have been or are being used commercially to any appreciable extent. Such processes, usually effected without pre-heating the metal, are objectionable for various reasons, among them being that the reduction is accompanied by such extreme and deleterious straining of the metal that the degree of reduction in any one operation must be held within relatively narrow limits and frequent intermediate annealing must be resorted to. Furthermore, the apparatus used is expensive, cumbersome and inefficient and even with the greatest care tubes which are eccentric or which have longitudinal fins, scratches or other imperfections are often produced and a high percentage of scrap loss cannot be avoided.

Many attempts have been made to avoid these well-known objections of long standing but it does not appear that anyone has heretofore brought forth any operative method or apparatus for the reduction of tubing superior to the drawing processes which now constitute substantially the only methods commercially practiced for the reduction of tubes in diameter or wall thickness or to accurate size.

The present invention belongs to that class of reducing processes to which reference has already been made, namely, to that where the stock is reduced without preheating the metal; and such processes involve what is generally called in the art "cold working". I have discovered that the frequent annealings which are required in all processes involving cold working in existence heretofore can be obviated by so working the metal that it is premitted to "flow" freely even though in a cold state, and I secure this free flow of cold metal by the method which constitutes my invention as I shall explain hereinafter and thus am able to effect the reduction of metal stock while cold to any extent without the use of any annealing whatever. In other words, in accordance with my invention the metal at any stage of the working, irrespective of the extent to which it is carried, is still ductile and its useful metallurgical characteristics have not been diminished or destroyed to such an extent that the metal by annealing cannot be brought back to its original condition if this is desired.

The present invention provides method and apparatus for reducing stock of a wide variety of metals and alloys and for producing a large degree of reduction in one operation or in repeated operations without excessive strain upon or dangerous embrittlement of the metal of whatever variety, at the same time avoiding the economic or mechanical objections heretofore noted with respect to present commercial methods as well as other objections which are well known to those skilled in the art. By way of comparison, the metallurgical characteristics of metals and alloys subjected to reduction by processes and apparatus embodying the present invention will be superior to corresponding properties of like metals subjected to the same degree of reduction by the present commercial methods. Furthermore, other beneficial results, which are impossible of attainment by present commercial methods are secured by the present invention.

The present invention will be herein described in connection with a selected illustrative embodiment thereof in apparatus shown in the accompanying drawings wherein:

Figure 4 is a transverse vertical section taken on the line 4—4 of Figures 3 and 6;

Figure 5 is a transverse vertical section taken on the line 5—5 of Figures 3 and 6;

Figure 6 is a horizontal section taken approximately on the line 6—6 of Figures 4, 5 and 9;

Figure 7 is a plan view of gripping jaws employed for feeding the stock;

Figure 8 is a section taken on the line 8—8 of Figure 7;

Figure 10 is an enlarged plan view of parts seen at the left end of Figure 1;

Figure 11 is a side elevation of parts shown in Figure 10;

Figure 12 is an elevation looking at the left end of Figures 10 and 11;

Figure 13 is a transverse vertical section taken on the line 13—13 of Figures 10 and 15;

Figure 14 is a transverse vertical section taken on the line 14—14 of Figures 10 and 15;

Figure 15 is a longitudinal vertical section taken on the line 15—15 of Figures 10 and 13;

Figures 1, 2:
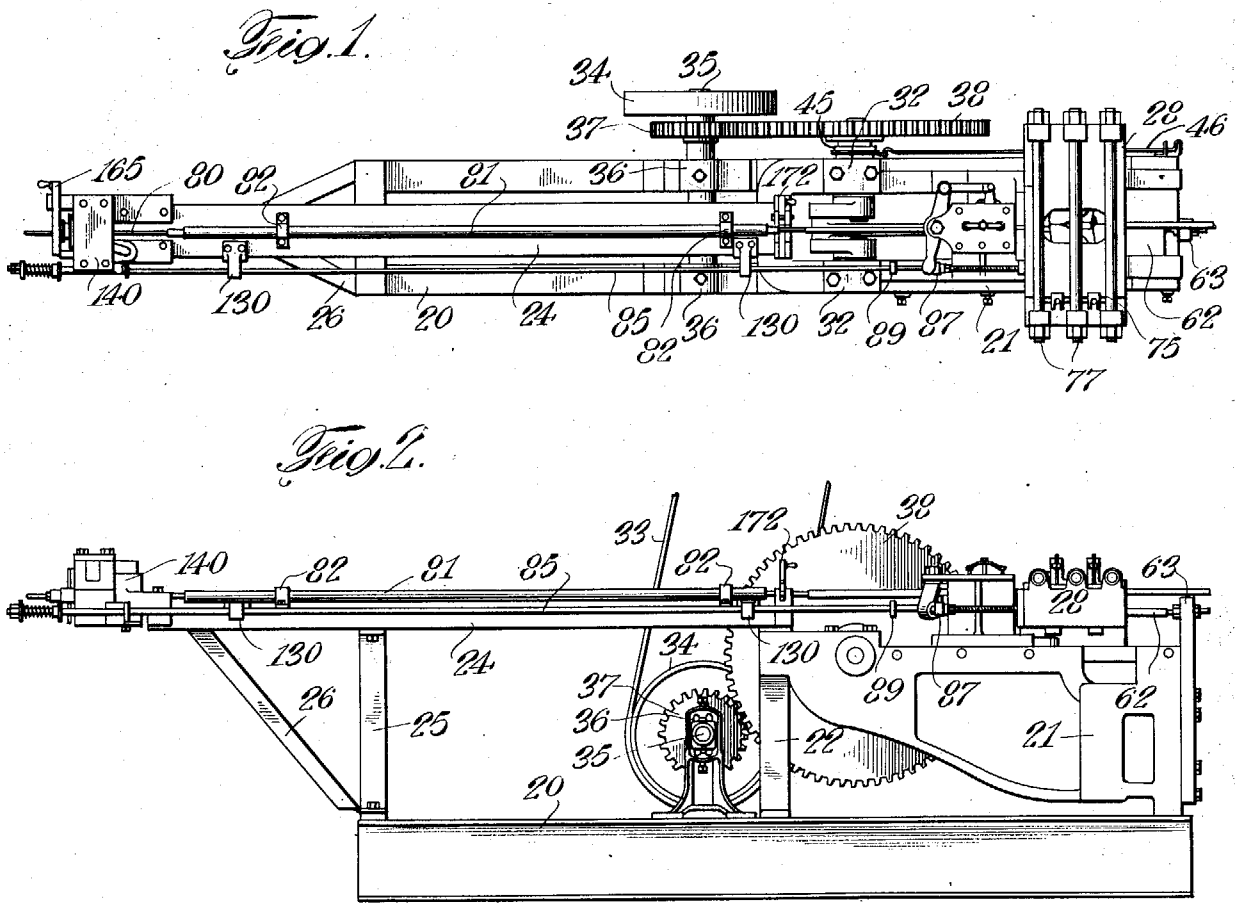
Figure 1 is a plan view of the apparatus.
Figure 2 is a side elevation.

Upon reference to Figures 1 and 2, it will be seen that the machine is supported upon horizontal beams 20 resting upon the floor or other suitable foundation. The right or front end of the machine at which reduction of the stock occurs comprises a bed 21 attached at its front end directly upon the beams 20 and at its rear end upon standards 22 secured upon the horizontal beams 20. The rear end of the machine toward the left of Figures 1 and 2 comprise a table 24 supported at its front end upon the bed 21 and at its rear end upon pedestals 25 and inclined braces 26 mounted upon the beams 20.

The bed 21 (Figures 4 and 5) is provided with facing V-grooved guides 27 upon which is reciprocably mounted a rocker frame or saddle 28. The guides may be adjusted by set screws 27*a* which bring the guides up upon the V-shaped slide ribs 29 of the saddle.

Figure 3:
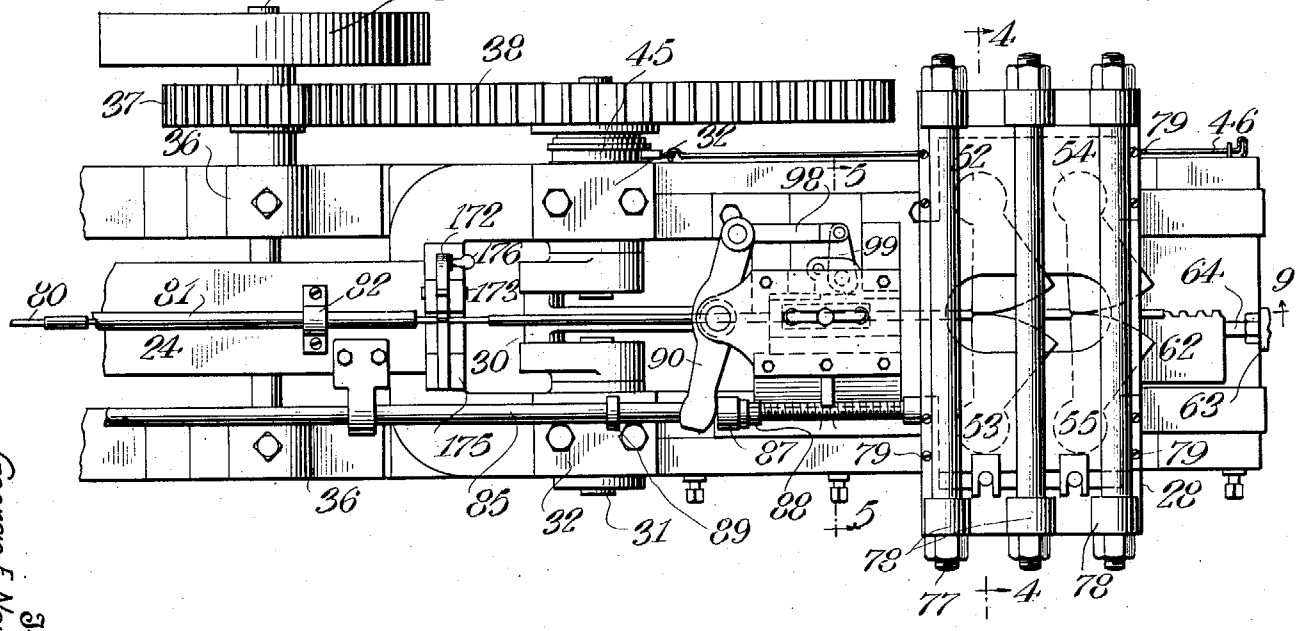
Figure 3 is an enlarged plan view of the right end portion of Figure 1.
Figure 9:
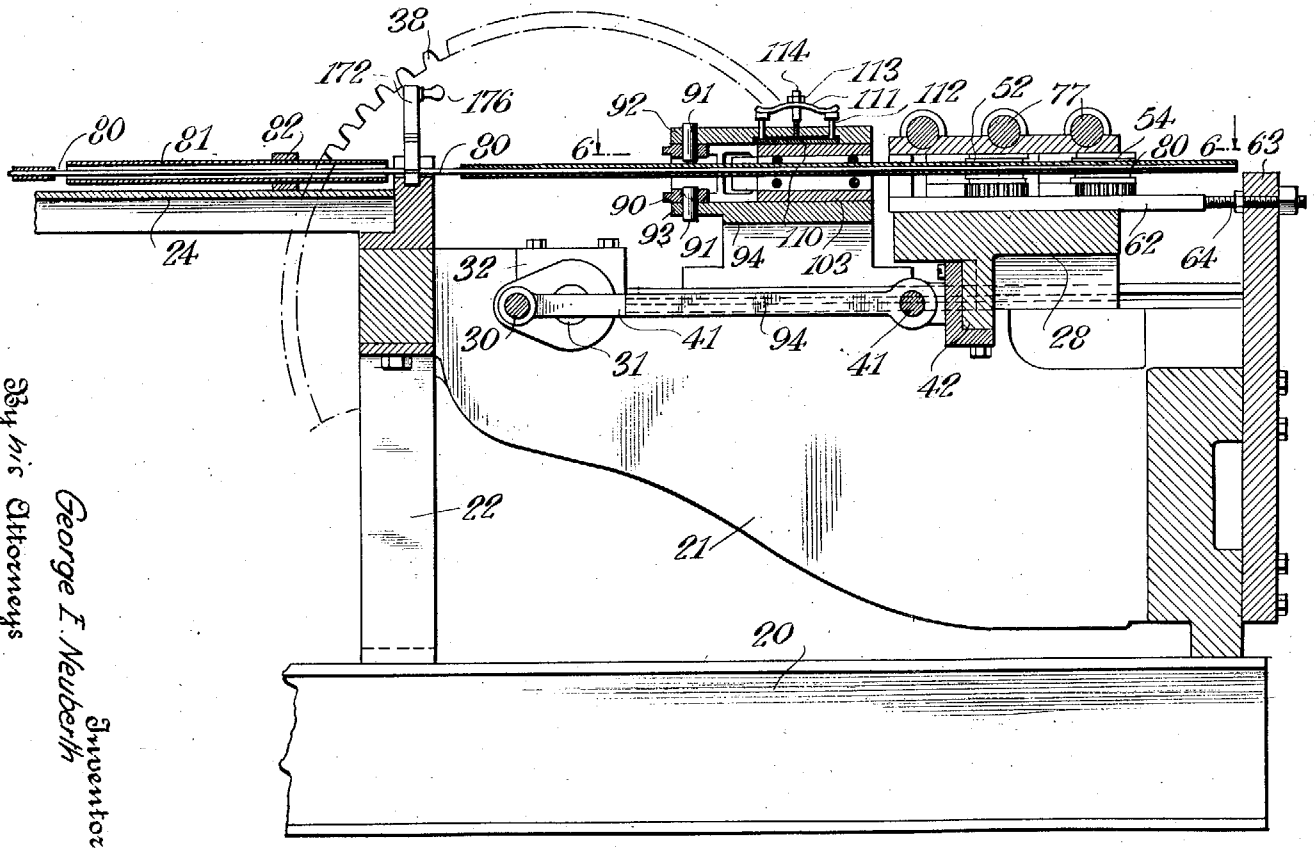
Figure 9 is a longitudinal vertical section taken on the line 9—9 of Figure 3.

The saddle may be reciprocated on its guides by any suitable mechanism. As shown, a crank shaft is employed. Referring to Figures 3 and 9, the crank pin 30 is carried by a crank shaft 31 mounted in bearings 32 in the sides of the bed 21. The crank shaft may be driven in any convenient manner as by a belt acting upon a pulley 34 fast on a drive shaft 35 supported by bearing brackets 36. The shaft 35 also carries a small gear 37 which meshes with and drives a larger gear 38 mounted and free to rotate on the crank shaft 31.

The gear 38 is connected with the shaft 31 through a clutch 45 operated by a rod 46 the handle of which is placed in a convenient location for the operator, as near the front of the machine.

The saddle 28 is operatively attached to the crank shaft 31 through a connecting rod 40 and a wrist pin 41 secured to a depending rib 42 of the saddle.

Referring to Figure 6, the saddle at each side is provided with a recess for receiving on the one side a bearing block 49 and on the other side the bearing blocks 50, 51 within which are journaled a plurality of rockers 52, 53, 54, 55, arranged in pairs or sets in tandem, the rockers 52, 53 comprising one set hereinafter referred to as the first set, and the rockers 54, 55 comprising another set hereinafter referred to as the second set, the designations being assigned in the order in which the rockers act upon the stock.

The rockers 52, 54 on one side (the left, Figure 4) are each provided with a broad faced gear segment 60 attached thereto by screws 61 or the like. These gear segments mesh with an adjustable stationary rack 62 slidably mounted at its rear end in the saddle 28 and at its front end secured to an upstanding bar 63 by nuts threaded on a reduced threaded extension 64. The mating rockers 53, 55 on the other side are each cut away on the lower side to clear this fixed gear rack and to accommodate an arcuate gear segment 65 attached to the rocker by screws 66 and in mesh with the teeth of the gear segment 60 on the other rocker. The gear segments on the left hand rockers are sufficiently broad to mesh with both the gear rack and the narrower gear segments of the right hand rockers.

The pitch line of the rack is located at the longitudinal axis of the stock being operated upon and the pivots of the rockers are reciprocated so there will be substantially no slippage of the rockers; that is, the action of the rockers will be as nearly as possible a true rocking motion upon the stock. Also by locating the rack between the rockers and placing the gear segments directly upon the rockers a rigid and sturdy assembly is secured which produces the maximum accuracy of work and minimum strain on the parts.

The rockers 53, 55 on one side may be forced toward those on the other side by means of wedges 70, 71 acting upon the bearing blocks 50, 51 of the rockers 53, 55; adjustment being effected by nuts on threaded extensions 72 thereof cooperating with overhanging abutments 75 formed upon the cover 76 of the saddle 28. The cover may be retained (Figure 3) by screws 79. To take the strain imposed thereon by the rockers the saddle may be strengthened by horizontal tension bolts 77 secured to upstanding apertured lugs 78 on either side of the saddle.

During reducing operations upon tubular stock the tube is interiorly supported upon a hardened mandrel 80. The mandrel extends between all of the rockers and terminates a short distance beyond the forward edge of the front (second) pair of rockers 54, 55. An extension of the mandrel which may be slightly smaller than the front end and of a lower grade unhardened metal reaches to the rear end of the machine where it is held against longitudinal movement but rotated by mechanism shown at the left of Figure 1 and more particularly described hereinafter. To prevent buckling of the mandrel extension, if it be of relatively small size it may be surrounded by sleeves or other devices. As shown it is embraced within a pipe 81 which is sufficiently large to enclose both the mandrel and a surrounding tube. This pipe 81 may be secured upon the table 24 by straps 82.

Figure 16:
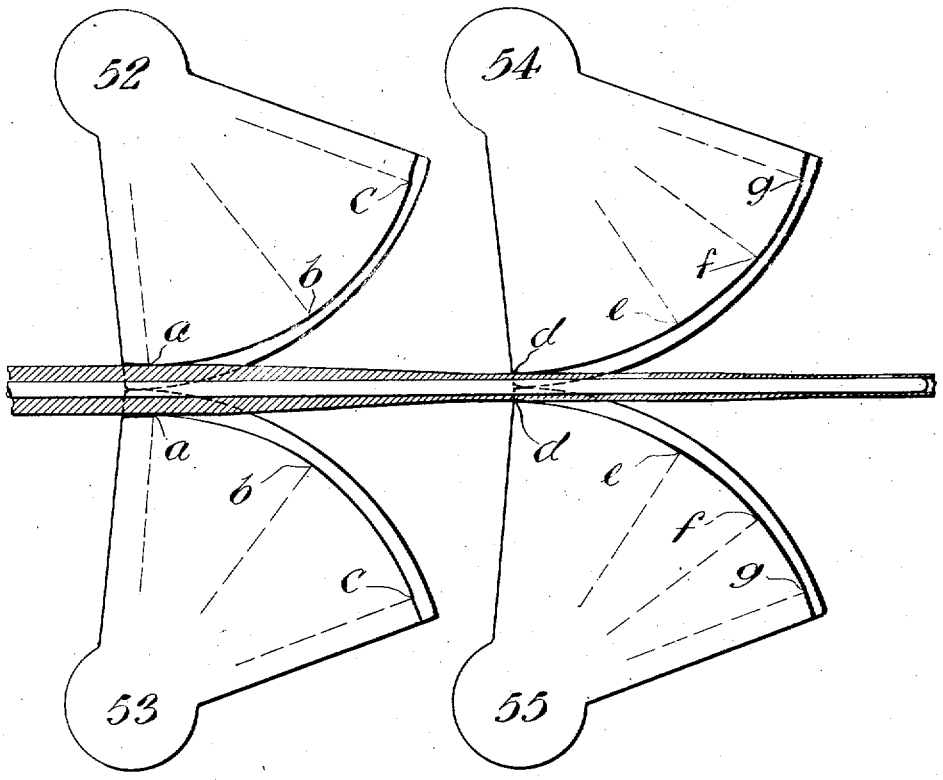
Figure 16 is a diagrammatic view to show the action of certain parts of the machine.
Figure 17:
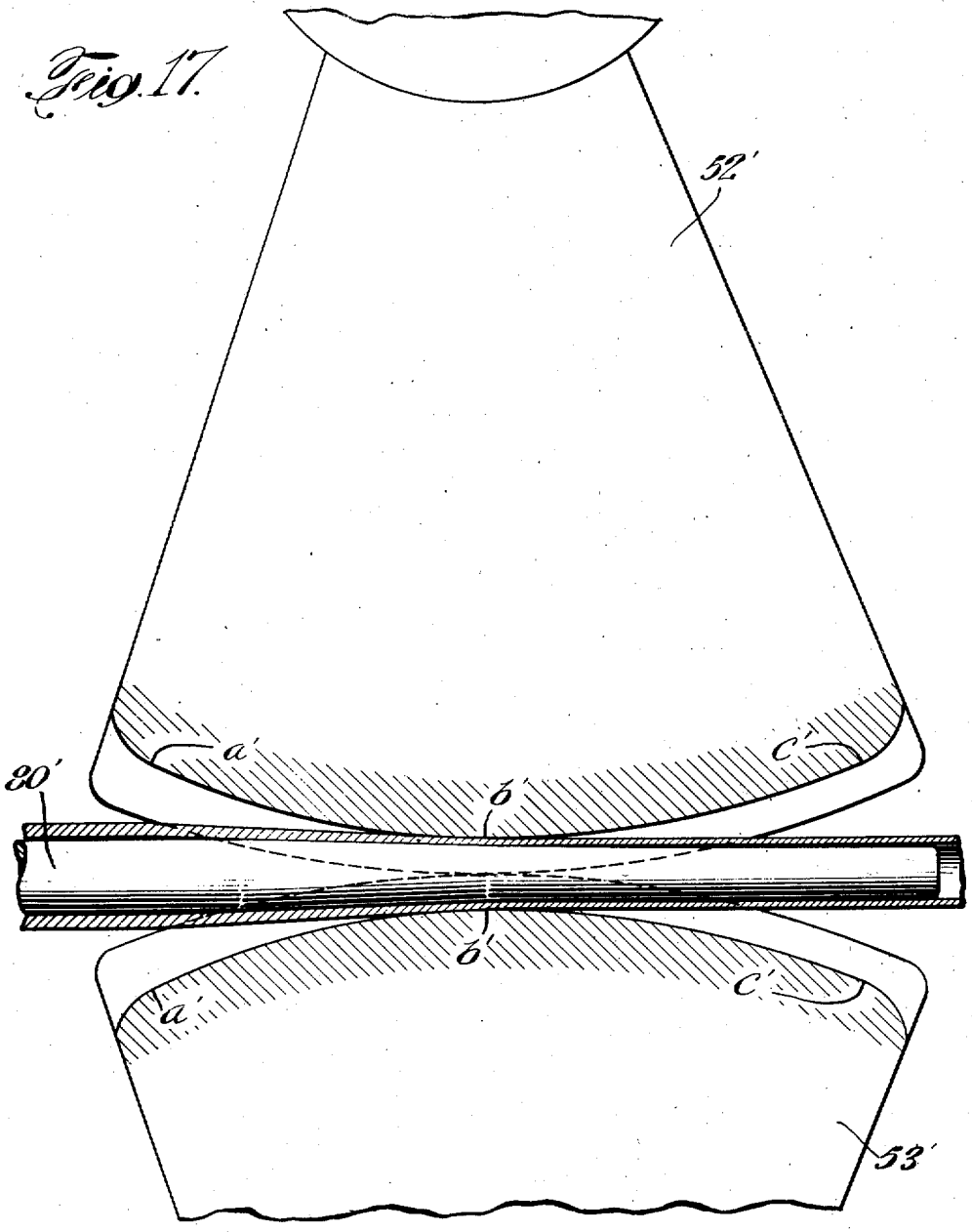
Figure 17 is a diagrammatic view showing parts employed for both diameter and wall reduction.

As heretofore mentioned, the machine is adapted to produce various kinds of reductions either in diameter, wall thickness or both together. The mandrel used will be made appropriate to the kind of reduction desired. If a reduction in diameter is desired the mandrel may be stepped down in diameter with the stepped or tapered portions coinciding in position with the rocker sets. For a small reduction in diameter a single step of the mandrel for one set of rockers may be sufficient as shown in Figure 17 and for a large reduction several steps of the mandrel, one for each set of rockers, may be utilized. If only the wall thickness is to be reduced the mandrel, as shown in Figure 16, may be substantially of uniform diameter throughout its working length with a slight taper to promote forward slippage of the tube on the mandrel.

The tapered mandrel provides free flow of metal off the front or free end of the mandrel, which is of advantage not only when the tube is shifted bodily by the feeding device but also when the reducing devices are working on it to increase its length. The principal working stroke or the reducing stroke as it is hereinafter referred to, of the rockers being toward the front end of the mandrel will also be down the taper of the mandrel so the metal can move forward easily as it is pressed out. On the succeeding stroke (return stroke of the rockers) the metal will be backed up by the tapered portion of the mandrel and the reducing devices are enabled to produce a more pronounced circumferential flow of metal. More particularly does the steep taper of the stepped mandrel referred to above permit the free forward flow of metal either when reducing the diameter or when reducing both diameter and wall thickness. Figure 17 illustrates the latter operation as effected with a single set of rockers, the same reference characters being used as in the corresponding part of Figure 16 but with the addition of a "prime" after each.

More particularly when working metal cold is it desirable that it shall flow forward freely while being reduced because it is only slightly plastic and if that portion which has been reduced cannot move rapidly out of the zone of action the metal may be seriously injured and excessive stress placed upon the machine to cause heavy power demands and very rapid wear of the working tools, i. e. the mandrel and the grooves of the reducing devices.

In all instances referred to the important consideration is that the reducing devices shall so cooperate with the mandrel as to "push" the metal under compression down the taper of the mandrel, that is, toward the free end thereof and in a forward direction. And by the term "pushing" I wish to establish a clear distinction over the "drawing" process in which the finished portion of the stock is subjected to great tension and in which a continuous wave of metal is worked up by the dies or rolls toward the unfinished portion of the stock to travel the full length thereof. The present process is essentially a "cold pushing" process as distinct from the "cold drawing" process, the latter being the only "cold working" process for reducing tubes of small size which has heretofore been practiced as far as I am aware.

Further, to assist slippage of the tube, lubricant may be provided between the tube and mandrel as by dipping the tube in a lubricant bath before inserting it in the machine. The lubricant may include finely divided graphite and a liquid to effect its adhesion to the tube.

Means are herein provided for feeding the tube forward at the proper time and in required lengths between the rockers. In the present embodiment of the invention the tube is fed forward when the rocker saddle is toward its rearmost position—as shown in the several views—the rockers moving forward to squeeze an increment of the tube stock toward the end of the tube and rocking back to their original position before the tube is again fed forward. As will be explained hereinafter the rocker grooves are so formed as to free the tube from all of the rockers at approximately the end of each stroke to permit the tube to be moved relative thereto.

The movements of the feeding mechanism are closely coordinated with the rocker movements and for rigidity and other advantages the feeding mechanism is located near the rockers. Here the feeding mechanism (Figures 3 and 6) is actuated by a push rod 85 secured to the rocker saddle 28. Conveniently the push rod may be secured to the saddle by being threaded therein until tightened against a shoulder 86 at the end of a larger threaded portion of the rod.

The push rod is provided with an adjustable feed collar 87 threaded thereon and held in adjusted position by a lock-nut 88 and a return collar 89 adjustably secured in spaced relation to the collar 87. These collars are adapted to actuate a horizontal feed lever 90 operating upon a fixed pivot by engagement with the bifurcated rod-embracing outer end of the lever.

As shown in Figures 6 and 9 the lever 90 is formed with an opening intermediate its ends, in order to clear the tube and mandrel. This lever is pivoted by pins 91 to extensions 92 and 93 on the cover and body respectively of a box-guide housing 94 which in turn is secured upon the bed 21 by bolts 95.

The end of the lever 90 (Figures 5 and 6) opposite the push rod is pivoted to a link 98 which in turn is pivoted to the outer end of a clamp cam lever 99. The cam lever is pivoted adjacent its inner end upon a pin 101 passing through spaced lateral lugs 102 of a clamp box 103 slidable within a longitudinal guide opening provided in the fixed housing 94. On one side the housing comprises spaced vertical walls 105 between which the cam lever 99 and associated parts operate. A cover 104 retains the clamp box within the housing.

Referring to Figure 9, a tension plate 110 bears upon the upper surface of the clamp box 103 being urged thereagainst by a leaf spring 111 acting at its outer ends upon the heads of set screws 112 extending through oversized holes in the cover and adjusted centrally by a nut 113 on a stud 114 threaded into the cover.

The inner end of the cam lever 99 is formed with a hardened cam surface 116 adapted to act upon the centrally raised side of one of a pair of cooperating tube-engaging clamp jaws 117, 118 fitting within the clamp box 103. The clamp jaws are urged apart by coil springs 120 disposed upon dowels 121 within mating recesses of the jaws.

The action of the tube feeding mechanism may be readily understood from Figure 6 which shows the parts at the end of the feeding movement. The saddle 28 when approaching the rear end of its stroke, where the tube is freed from the rockers, causes push rod 85 through collar 87 to move lever 90 clockwise about its central fixed pivot to move the cam lever 99 clockwise also. This causes the cam lever 99 acting through its cam surface 116 to press the clamp jaws together, as shown in Figure 6. Further movement of the lever 90 causes the pivot pin 101 of the cam lever 99 to move forward since the cam lever cannot rotate further, whereupon the pin 101 being borne by the clamp box 103 causes the box and the clamping jaws to move forward, carrying the stock forward. When operating upon tubular stock wherewith a mandrel is used, the mandrel does not partake of this forward movement.

The jaws and clamp box are returned idly to original position to engage the tube at a new position by the reciprocating saddle as it approaches the other or forward end of its stroke. Before this return the jaws must be released from the stock. This may be accomplished by the springs 120 forcing the jaws apart after the collar 87 has separated from the lever 90 since the cam face 116 of the cam lever 99 is off center with reference to the pivot pin 101 of the lever. However, if the release has not previously occurred it will follow when the return collar 89 strikes the end of the lever 90 to move the cam lever in a counter-clockwise direction. Continued counter-clockwise movement of the cam lever 99 brings it against the pin 122 fixed in the clamp box adjacent the pivot pin of the cam lever thereby returning the clamp box and clamp jaws with the cam lever to their rearmost positions.

It will be observed from the preceding description that the feeding mechanism remains at a fixed station and engages the tube at successive points along its length and also that it is enabled to feed tubes end to end continuously to the rockers thus avoiding scrap loss and greatly speeding up the operation of the machine.

The reducing action thus occurs in the presence of an increment of feed of stock, and is effected by working the metal toward the starting end of the stock, that is, toward the previously reduced portion, so as to avoid working up a pronounced wave of metal in the stock with consequent injurious action on the metal. While some reduction may necessarily occur when working the stock in the opposite direction, it will be small, so the forward working action is spoken of herein as the "reducing action" and more specifically as the "reducing stroke".

After the reducing action has been effected there occurs a consolidating action for smoothing the stock, rounding it up (and here it is to be noted that throughout the specification the terms "round up", "tubular", "cylindrical", etc., are used to embrace more than merely stock which is round or circular in cross section), removing fins, loosening the stock from the mandrel in order that it may be slipped therealong, and such action on the metallic structure of the stock as may occur. The term "consolidating" embraces any one any several or all of these effects. In the specific machine shown herein these reducing and consolidating actions give rise to a particular preferred cycle of operation, as follows:—

1. Reducing stroke in the presence of or accompanied by an increment of feed;

2. Stock and reducing devices have a relative circumferential turning movement with reference to each other at the completion of the reducing stroke;

3. Consolidating stroke unaccompanied by an increment of feed of stock;

4. Feed of stock without turning movement with reference to each other at the completion of the reducing stroke.

The relative turning of stock and reducing devices herein is accomplished by turning the tube so the rockers will operate upon a different part of its circumference. The turning of the tube is preferably effected through the turning of the mandrel and preferably at the end of the forward or reducing stroke of the rockers after they have released the stock. At this time the feeding jaws have also released the stock. In the illustrative apparatus described herein, there is no forward feeding of the stock at this end of the rocker stroke and the rockers on their return stroke will act upon substantially the same longitudinal sections of the stock as on their forward stroke.

Briefly, then, the feeding and turning of the stock occur in alternation at opposite ends of the rocker strokes, the feeding at the rear end of the stroke after the rockers have loosened the tubular stock on the mandrel and the turning at the forward end of the stroke after the rockers have tightened the stock on the mandrel.

In this connection the advantage of using oscillating rockers rather than continuously rotating pilger rolls should perhaps be pointed out. Continuously rotating "pilger" rolls when operating upon cold metal produce such excessive hammering that the rolls themselves as well as the work are rapidly injured; whereas with the simple harmonic motion of the rockers the bite into the metal stock takes place without any blow or hammering whatever and increases gradually and smoothly, so that when such oscillating rockers are combined in a machine in such a way as to push the metal forward and downward upon a tapering mandrel, the conditions for working the stock cold and producing a free flow of the metal are completely realized.

The mechanism for turning the tube is shown in Figures 1 and 2 and in greater detail in Figures 10 to 15 inclusive. The push rod 85, which as described above is directly actuated by the rocker saddle and which actuates the feeding mechanism, is also employed to actuate the turning mechanism.

In Figure 10 this push rod 85 is seen to extend through guides 130 attached to the side of the table 24 and at its rear end is provided with a loose collar 131 fitting upon a reduced portion 132 of the push rod. The collar is normally urged against the shoulder defining the front end of the reduced portion by a coil spring 133 whose rear end engages a washer held by locknuts 134. Spaced forward from the collar 131 the push rod is provided with a return collar 135 secured thereon in any suitable way as by a set screw.

The spaced collars 131 and 135 operate the bifurcated end of an arm 138 fixed upon the lower end of a vertical rock shaft 139 mounted in a bearing in a frame 140 secured upon the rear end of the table 24 by cap screws 141.

An arm 143 rigidly secured to the upper end of the shaft 139 is formed with an enlarged cylindrical end 144 fitting within a notch 145 of a horizontally guided rack bar 146 for reciprocating the rack bar.

Referring to Figures 14 and 15 this rack bar 146 meshes with a pinion 147 formed on the mid-portion of a sleeve 150, the sleeve operating at its front end within the bearing 151 in the front vertical wall of the frame 140 and being provided at its rear end with an exterior bushing 152 made fast thereon as by shrinking, sweating or welding. The bushing is mounted in a suitable bearing 153 in the rear vertical wall of the frame 140.

The rear end of sleeve 150 is cut through to provide a notch 154 (Figure 13) and the bushing 152 is provided with a cylindrical socket 155 opening from its interior surface for the reception of a pawl 157. The pawl is adapted to engage notches 158 provided on the outer peripheral surface of a removable bushing 159 fitting within the sleeve 150 and splined to the mandrel 80 by a key 160, the key preferably being either formed integral with or secured to the bushing. The sleeve 150 with its attached bushing 152 and the operating pawl 157 are retained in proper position by a face plate 161 secured to the end wall of the frame 140. The rack bar is held in position by the frame cover 142 retained by cap screws or otherwise.

The rear end of the removable bushing 159 is provided with a flange 163 for easy manipulation by an operator when the part is to be removed or replaced.

In Figure 15 it will be seen that the front end of the sleeve 150 is provided with an interior cylindrical opening 164 concentric with the mandrel 80 of sufficient size to permit a tube being slipped therethrough over the mandrel when the interior bushing 159 is removed.

The mandrel is held against longitudinal movement, the tube feeding mechanism moving the tube in successive increments along the mandrel and finally forcing it off the front end of the mandrel by the action of a following tube which has been introduced over the rear end of the mandrel. As herein shown the mandrel is normally held (Figures 12 and 15) by a latch bar 165 provided with a notch 166 adapted to embrace the mandrel within an annular groove 167 adjacent the rear end of the mandrel. The latch bar is pivoted on the rear frame 140 upon a pin 168 and is equipped with a handle 169 for manual operation. The free end of the latch bar when operative for holding the mandrel is held within a catch 171.

Adjacent the front open end of the guide pipe 81 and spaced sufficiently from the rotating mechanism to accommodate one or more lengths of tube, a second latch 172 (Figure 3) is pivoted to a fixed member by a pin 173, this latch also being provided with a notch similar to that of latch 165 adapted to embrace the mandrel within an annular groove formed thereon. The latch 172 may be lowered into a catch 175 by a handle 176. The second latch is adapted to hold the mandrel against longitudinal movement while the first mentioned latch at the rear end of the mandrel is raised for the insertion of a tube over the end of the mandrel.

This construction permits tubes to be introduced into the machine over the rear end of the mandrel although the mandrel is normally subjected to the action of the rotating mechanism. Moreover, the construction permits very rapid and convenient insertion of tubes thus avoiding delays in the operation of the machine.

As has already been explained and as will be presently made clearer by reference to diagrams, the rockers release the tube at the end of their forward stroke in order that it may be turned. If it should occur, however, that the rockers have not fully released the tube at the time the collar 131 on the end of the push rod 85 has come in contact with the end of the arm 138 for operating the tube turning mechanism, or if the clamp jaws have not released the tube, the spring 133 will absorb the movement of the push rod until such time as the tube is released and thereafter cause the tube to be turned under the stored energy in the spring. This turning is sufficient to bring those parts of the circumference of the tube which on the forward stroke were located at the edges of the rocker grooves to new positions in the circumferential center of the grooves. In the present machine where two rockers constitute a set this means a turn of 90 degrees.

When the saddle and the push rod 85 move rearwardly the return collar 135 adjacent the end of the push rod engages the front side of the arm 138 and rotates the sleeve 150 with its bushing and pawl in a counter-clockwise direction to carry the pawl behind the next notch ready for the following rotative impulse.

In the interest of speed, accuracy, economy and various other desirable considerations tandem rockers have been employed. A very considerable reduction and an accurately sized and smoothed tube can thus be produced by the action of a single machine. But when tandem rockers are employed the succeeding sets must take increased lengths of tube from the preceding sets and this should be accomplished without causing buckling or other distortions in the tube. To avoid such distortions the rockers should maintain a true rolling contact with the tube at all times while reduction is in progress. In Figure 16 one embodiment of mechanism for accomplishing this result is illustrated, the result here being attained by the shape and disposition of the grooves of the rockers.

In Figure 16 each rocker of the first-acting set 52, 53 is formed with an enlarged clearance groove extending from one (the leading) edge to the point *a*, the enlarged groove being of sufficient size to permit the original stock to be fed forward between the rockers. From the point *a* to the point *b* near the middle of the arcuate length of the rocker the groove is converging or acentric to effect reduction of the tube. From the point *b* to the point *c* near the trailing edge of the rocker the groove is made concentric to smooth and size the tube. From the point *c* to the edge of the rocker another enlarged clearance groove is provided, the groove being of sufficient size to stand clear of the first-reduced stock. The clearance grooves are only slightly enlarged and thus formed do not permit the tube to have any considerable play or whip therein.

Each rocker 54, 55 of the second set is formed with a concentric groove portion extending from the leading edge *d* to a point

*e* near the arcuate center of the rocker, the point *e* being sufficiently in advance of the point *b* of the first set as the rockers operate to cause the second set to seize the tube just before release by the first set. From the point *e* to the point *f* the rocker groove is converging or acentric for reducing the tube; from *f* to *g* it is concentric for smoothing; and from *g* to the trailing edge it is enlarged for clearing or freeing the tube. It will, of course, be understood that in the present illustration the two opposed grooves together provide a round hole of varying diameter as the rockers operate.

In operation, the tube is fed forward along the mandrel between the rockers when they are near the position indicated in Figure 16, the enlarged clearance grooves permitting this to be readily accomplished. In that figure the feeding movement has just been completed and the rockers are ready to commence their forward movement (the reducing stroke) to the right.

At the beginning of the forward movement the acentric portions *a—b* of the first set of rockers act to reduce the tube while the concentric portions *d—e* of the second set of rockers permit free forward travel of the tube caused by the elongation of the tube at the first set of rockers. Shortly before this reduction by *a—b* is completed, the acentric portions *e—f* of the second set of rockers come into action and reduction of the second set occurs while the portions *b—c* of the first set are smoothing.

Thereafter, both the portions *f—g* of the second rockers and the latter part of the portion *b—c* of the first rockers act at the same time to smooth the stock. Beyond the points *c* of the first set and *g* of the second set the rockers release the tube, whereupon the turning mechanism rotates the mandrel and thus rotates the tube by frictional engagement therewith. On the return or backward stroke the rockers return to their starting points along the tube but in doing so they round up the tube and loosen it from the mandrel by action upon a different circumferential portion from that on which they acted on the forward stroke.

If desired the hubs of the rockers and their bearings may have a cooling fluid circulated over or through them to prevent expansion which might cause a small change in the size of the tube produced and a sufficient amount of cooling fluid may be supplied to overflow onto the stock being worked. However the action of the apparatus is such that for most materials and reductions no deleterious heating of the stock takes place even when no cooling fluid reaches it. This cooling fluid may have lubricating properties.

Machines embodying the present invention may be built in many sizes to reduce stock of various metals, types and sizes. Data derived from the operation of certain machines will be given for purposes of illustration.

The rocker saddle of one machine had a five inch stroke and the crankshaft driving the saddle had a speed of 110 R. P. M. An annealed steel tube was fed cold to the machine at the rate of ½″ per stroke. The finished tube was produced in a length of approximately 1⅞″ per stroke giving an elongation of almost four to one. The original tube was ¾″ outside diameter with an average wall thickness of .065 and had an eccentricity of about five thousandths of an inch. That is, the wall on the thickest side was .005″ thicker than the wall on the thinnest side.

The first set of rockers reduced the outside diameter of the tube from ¾″ or .750″ to .635″ and reduced the wall thickness from .065″ to .049″.

The tube as finished by the second set of rockers was .625″ outside diameter and .035″ average wall thickness and the eccentricity was reduced to less than .005″. The final tube as it issued from the machine was but slightly warm to the touch.

Another machine having a ten inch stroke and a crankshaft speed of 96 R. P. M., in one operation reduced brass or copper tubing from 2¼″ to 1½″ outside diameter with a corresponding reduction in wall thickness of from .220″ to .083″. The finished tube was perfectly straight and of smooth and uniform gauge.

The foregoing description has been directed mainly to the working of tubular stock but in certain features the invention is applicable to other shapes of bar stock. Furthermore, while one specific embodiment of the invention has been described in detail it is to be understood that various modifications and changes may be made within the spirit of the invention as set forth in the following claims.

What I claim is:

1. Apparatus for reducing tubes, comprising in combination, an axially fixed tube supporting mandrel (80), a rocker frame (28) reciprocable along the mandrel, a plurality of reducing rockers (52, 53, 54, 55) mounted in said frame and adapted to work upon a tube supported upon the mandrel, a removable sleeve (159) splined to said mandrel near the end remote from said rockers, means (157 and related parts) for rotating said sleeve and mandrel when the rocker frame is at the forward end of its stroke, a latch (165) mounted near said turning sleeve normally holding said mandrel against axial movement, a second latch (172) spaced forwardly from said first mentioned latch by a distance greater than the length of tube stock fed to the machine, said second latch being operable to hold said mandrel against axial movement while said first latch and sleeve are removed for introducing a tube, feeding means located near the rocker frame including jaws (117, 118) for gripping the tube at successive places along its length, and means (99 and related parts) for actuating said feeding means when the rocker frame is at the rearward end of its stroke, the turning, feeding and mandrel-holding means all being designed to permit tubes being fed seriatim along the mandrel from its rear end where the tubes are introduced to the front end where they are expelled.

2. Apparatus for reducing tubes, comprising in combination, an axially fixed tube supporting mandrel, reducing rockers reciprocable at their pivots so as to rock upon a tube supported upon said mandrel, said rockers being formed with grooves enlarged at their ends for releasing the tube at each end of the stroke, means to feed the tube along the mandrel in increments each time the rockers are in their rearward position and means for turning the tube and mandrel each time the rockers are in their forward position, whereby the tube is principally reduced and squeezed tight upon said mandrel on the forward stroke of the rockers and is principally smoothed, rounded and loosened upon the mandrel on the rearward stroke of the rockers, the rockers returning to their starting point at the end of the rearward stroke.

3. Apparatus for reducing tubular stock, in combination, a tube supporting mandrel, reducing rockers cooperating with said mandrel for reducing the tubular stock, and means for turning and feeding the stock in alternation at opposite ends of the rocker stroke.

4. The method of reducing tubular stock with a tube supporting mandrel and oscillatory rockers cooperative therewith, which comprises feeding the tubular stock between the rockers, reducing the tubular stock by working it by said rockers away from the original stock and toward the previously reduced portion, turning said tubular stock approximately half the circumferential width of said rockers after the reducing stroke has been completed and rocking back up the same length of the stock to smooth it and loosen it upon the mandrel.

5. The method of reducing tubular stock with a supporting mandrel and cooperating rockers which comprises feeding and turning the stock in alternation at opposite ends of the rocker stroke.

6. In reducing apparatus for tubes, in combination, a tube-supporting mandrel, reducing rockers for reducing a tube upon said mandrel, means engageable with said mandrel to rotate it together with the tube, means to hold said mandrel against substantial axial movement, and means engaging the tube to feed it by successive increments to said rockers, said turning, holding and feeding means being constructed to pass tubes therethrough to permit tubes to be fed seriatim from the rear end of the mandrel over which they are introduced to the front end of the mandrel where they are expelled.

7. In tube reducing apparatus in combination, a mandrel, tube-reducing means acting upon successive increments of length of the stock cooperating therewith, and mounting means for said mandrel, said mounting means being provided with parts readily disengageable from the mandrel to pass the tubes therethrough permitting tubes to be fed over the rear end of said mandrel but normally engaging said mandrel for holding it substantially fixed against axial movement.

8. In tube reducing apparatus in combination, a mandrel, tube-reducing means acting upon successive increments of length of the stock cooperating therewith, and mounting means for said mandrel, said mounting means being constructed to pass tubes therethrough permitting tubes to be fed over the rear end of said mandrel.

9. In reducing apparatus for tubes, in combination, reducing rockers, a mandrel, and means including a sleeve splined on said mandrel for rotating it, said sleeve being removable for insertion of a tube over the rear end of the mandrel for feeding the tube to the rockers.

10. In reducing apparatus for tubes, in combination, a reciprocable frame, reducing rockers pivoted upon said frame, said rockers engaging said tube at times, but being free therefrom at other times and means actuated directly through said reciprocable frame for rotating the tube in synchronism with the movement of the rockers.

11. Apparatus for reducing tubes comprising reducing rockers, a tube supporting mandrel and means for rotating said mandrel at intervals, said means including a removable bushing having a splined connection with said mandrel, a sleeve surrounding said bushing, the sleeve having an interior bore of sufficient size to permit tubes to pass through it, means provided on said sleeve for turning said bushing, a rack geared to said sleeve to oscillate it, and means for operating said rack.

12. In reducing apparatus for tubular stock in combination, a tube supporting mandrel which is rotatable but substantially fixed longitudinally, means for rotating said mandrel including a removable splined sleeve and means for actuating said sleeve when in operating position, and means to hold said sleeve and mandrel in axial position.

13. In reducing apparatus for tubular stock in combination, a tube supporting mandrel which is rotatable but substantially fixed longitudinally, means for rotating said mandrel including a removable splined sleeve, means for actuating said sleeve when in operating position, and a latch for axially holding said sleeve and said mandrel.

14. In apparatus for reducing tubular stock in combination, reducing means acting intermittently upon successive relatively short increments of length of the stock, and intermittently acting feeding means synchronized in action with the action of the reducing means for supplying a substantially continuous line of tubes one after another to said reducing means.

15. In reducing apparatus for elongated stock in combination, reducing means acting intermittently upon successive relatively short increments of length of the stock, and feeding means synchronized in action with the action of the reducing means for feeding lengths of stock intermittently to said reducing means, said feeding means intermittently and successively engaging the stock along its length.

16. In reducing apparatus for tubular stock in combination, reducing devices of the step-by-step type acting intermittently upon successive increments of length and feeding means synchronized in action with the action of the reducing means gripping the tubular stock upon its outer periphery to feed it.

17. In reducing apparatus, in combination, a reciprocable frame carrying reducing rockers, and means actuated directly through said frame for causing feeding of the stock to said rockers in synchronism with the movement of the rockers.

18. In reducing apparatus, in combination, a reciprocable frame, reducing rockers pivoted in said frame, a rod attached to said frame for causing feeding of said tube, and means to regulate the feed.

19. In reducing apparatus, in combination, a reciprocable rocker frame, gripping jaws for feeding the stock forward, a reciprocable clamp box embracing said jaws, a cam lever pivoted to said box adapted to close said jaws, and means for operating the cam lever for causing it to close the jaws and subsequently move the box with the gripping jaws.

20. In reducing apparatus, in combination, a tube supporting mandrel, swaging rockers cooperating with said mandrel for reducing tubes in successive increments of length and mechanism for feeding tubes in successive increments along said mandrel, said feeding mechanism occupying a fixed station near the rockers.

21. Apparatus for reducing tubes, in combination, reducing devices for squeezing the tubes out in successive increments, a mandrel along which the tubes are fed forward to said devices, and mechanism for rotating said mandrel, said mandrel being made accurately to size and hardened in that portion cooperating with the devices but being of smaller diameter and unhardened in the portion beyond the devices over which tubes are fed and through which the rotating mechanism acts.

22. Apparatus for reducing tubes, in combination, tube reducing devices acting upon successive increments of length of stock and an axially fixed tube-supporting mandrel cooperating therewith, said mandrel being tapered in that portion traversed by the devices, the finished tube being formed without taper.

23. Apparatus for reducing tubes, in combination, an axially fixed tube supporting mandrel, a frame reciprocable along the mandrel, a plurality of reducing devices mounted in said frame, and means for feeding tubes in successive increments along said mandrel.

24. Apparatus for reducing tubular stock, in combination, a tube supporting mandrel, rockers for reducing the stock in successive increments and means for feeding the stock in increments along the mandrel, there being lubricant provided between the mandrel and stock.

25. Apparatus for reducing tubular stock, in combination, a rotatable tube supporting mandrel, reducing rockers cooperating with said mandrel for reducing the stock in successive increments, means for feeding the stock in successive increments along said mandrel, and means for periodically rotating said mandrel to rotate the stock, there being lubricant provided between said mandrel and stock.

26. The method of reducing tubular stock upon a rotatable mandrel between reducing rockers which comprises slipping the stock in successive increments along the mandrel and providing lubricant between the mandrel and stock to promote this slippage, the lubricant, however, not preventing turning of the stock with the mandrel.

27. Apparatus for reducing elongated stock comprising tandem sets of oscillating grooved rockers arranged to turn in unison, characterized by the fact that the part of the rockers that effects the reducing action in a subsequent set of rockers is so located relative to the part that effects the reducing action in the preceding set of rockers, that on the same directional stroke, the reducing action of the subsequent set of rockers lags behind that of the preceding set of rockers.

28. Apparatus as specified in claim 27 in which the rockers of the several sets of rockers have smoothing portions which are so located that the several sets of rockers simultaneously exercise a smoothing action toward the end of their reducing stroke.

29. Reducing apparatus for elongated stock comprising a plurality of reciprocable-pivot rockers whose adjacent edges are all held against slippage by a common stationary rack.

30. In reducing apparatus for tubes, in combination two pairs of coordinated tandem rockers, the first acting pair of said rockers being formed convergent for approximately half their arcuate length and concentric for the remainder, and the second acting pair of rockers being formed concentric and oversize for slightly less than half their arcuate length and next convergent then concentric for the remainder.

31. Apparatus for reducing metal stock in successive increments of length, in combination, means successively acting upon the stock to reduce it, and means for turning and feeding the stock in alternation between successive actions of the reducing means.

32. Apparatus for reducing tubular stock in successive increments of length, in combination, a tube supporting mandrel, means successively acting upon the stock to reduce it, and means for turning and feeding the stock in alternation between successive actions of the reducing means.

33. The method of reducing metal stock by reducing means acting in succession upon short increments of length which comprises working the stock by the reducing means, and feeding and turning the stock in alternation between successive actions of the reducing means.

34. The method of reducing tubular stock with a supporting mandrel and cooperating reducing means acting in succession upon short increments of length which comprises working the stock, by the reducing means, and feeding and turning the stock in alternation between successive actions of the reducing means.

35. Apparatus for reducing stock, comprising in combination, intermittently acting swaging devices, means for feeding stock longitudinally in successive increments to said swaging devices, said swaging devices acting successively upon the stock with an accompanying increment of feed to reduce it, and means for intermittently consolidating the same length of stock without an accompanying increment of feed.

36. Apparatus as set forth in claim 35 in which means are provided for presenting the stock in different postures to the swaging devices, whereby the latter are utilized for effecting the consolidation as well as the reduction of the stock.

37. Apparatus as set forth in claim 35 in which said swaging devices effect the consolidation as well as the reduction of the stock and in which they effect the consolidation while moving in a direction opposite to that which they had during the reducing action.

38. The method of reducing stock by intermittently acting swaging devices relative to which the stock is fed longitudinally in successive increments, which comprises, successively acting upon the stock by the swaging devices with an accompanying increment of feed to reduce it and intermittently consolidating the same length of stock without an accompanying increment of feed.

39. The method as set forth in claim 38 in which the stock is presented in different postures to the swaging devices and in which said swaging devices are utilized for effecting the consolidating action as well as the reducing action.

40. The method set forth in claim 38 in which the stock is present in different postures to the swaging devices and in which said swaging devices are utilized for effecting the consolidating action as well as the reducing action and in which the swaging devices move in an opposite direction while effecting the consolidation from that which they had while effecting the reduction.

41. The method set forth in claim 38 in which the metal is worked in a cold state.

42. In a tube reducing apparatus in combination, intermittently acting tube reducing devices which reduce the tube in successive increments of length, a mandrel cooperating therewith, and holding means for said mandrel, said means including parts engageable and disengageable with said mandrel, the means having a clearance space large enough to pass a tube therethrough when the parts are disengaged from the mandrel.

43. The method of reducing the cross-sectional area of tubular stock to produce finished stock of uniform diameter and gage which comprises, working the metal upon the tapered portion of a tube supporting mandrel by intermittently acting swaging devices which have a longitudinal rolling action along the length of the stock and which push the metal forward under compression in successive relatively short increments of length down the taper toward the starting end of the stock.

44. The method of reducing the cross-sectional area of tubular stock to produce finished stock of uniform size which comprises, working the metal while in the cold state upon the tapered portion of a tube supporting mandrel by intermittently acting swaging devices which have a longitudinal movement relative to the stock and which push the metal forward down the taper under compression in successive relatively short increments of length toward the starting end of the stock.

45. The method of reducing the cross-sectional area of tubular stock to produce finished stock of uniform gage and diameter which comprises, working the metal upon the tapered portion of a tube supporting mandrel in successive increments of length by intermittently acting swaging devices provided with grooves with eccentric or tapered portions and having a rolling movement upon the tapered portion of the mandrel, while maintaining a predetermined relationship between the swaging devices and between the swaging devices and the mandrel.

46. The method of reducing the cross-sectional area of tubular stock which comprises, working the metal repeatedly in successive short increments of length forward down the tapered portion of a tube supporting mandrel by oscillating swaging devices which roll longitudinally upon the stock with a simple harmonic motion, and meanwhile holding the mandrel during the repeated working actions to a constant positional relationship relative to the swaging devices.

47. The method of producing a metal tube which comprises, swaging the tube stock in the cold state in successive short increments of length upon a tapered mandrel from the larger part to the smaller part with reducing devices which have a rolling motion down the taper.

48. The method of producing a metal tube which comprises, swaging the tube stock in the cold state in successive short increments of length upon a tapered mandrel from the larger part to the smaller part with reducing devices which have a rolling motion down the taper, and supplying lubricant between the tube and the mandrel.

49. The method of producing a metal tube which comprises, swaging the tube stock in the cold state in successive short increments of length upon a tapered mandrel from the larger part to the smaller part with reducing devices which have a rolling motion down the taper, and consolidating the last reduced portion by a swaging action upon a different diameter of the stock after each reducing action.

50. The method as set forth in claim 49 in which said consolidation is effected by the swaging devices rolling up the taper of the mandrel and before the tube has been fed forward longitudinally along the mandrel.

51. The process of working a metal tube to reduce its cross section which comprises pushing the metal forward under compression in successive relatively short increments of length down a tapered mandrel while the metal is in the cold state.

52. Apparatus for reducing the cross-sectional area of tubular stock to produce a finished stock of uniform size which comprises in combination, a set of swaging devices provided with tapered working grooves, a mandrel provided with a tapered portion cooperating with the tapered portion of the swaging devices, means for holding the mandrel against longitudinal movement with the tapered portion registering with the tapered portion of the reducing devices, and means for traversing said reducing devices along and upon the stock to reduce the stock by pushing it down the taper of the mandrel.

53. Apparatus as set forth in claim 52 in which said reducing devices also comprise a straight groove portion and in which said mandrel also comprises a straight portion except for a slight taper to aid in stripping the tube therefrom at each stroke.

54. Apparatus as set forth in claim 52 in which the grooves in said swaging devices have a greater taper than the mandrel taper whereby the stock is simultaneously reduced in gage and diameter.

55. Apparatus as set forth in claim 52 in which means are provided for maintaining the stock in a cool state while it is being worked.

56. Apparatus as set forth in claim 52 in which said reducing devices are also provided with a straight groove which acts upon the tube after it has left the tapered portion of the mandrel.

57. In apparatus for reducing metal stock in successive increments of length, in combination, a frame in which reducing devices are mounted, gripping jaws for feeding the stock forward, a reciprocable mounting box for said jaws, and means actuated by the reciprocatory action between said frame and feed jaws for causing the jaws to intermittently grip the stock and feed it in successive increments to the reducing devices between the actions of the latter upon the stock.

58. The method of reducing metal tubes which comprises working the metal in successive increments of length under compression down the taper of a supporting mandrel.

59. The method as set forth in claim 58 in which the metal is consolidated between successive reducing actions.

60. The method of reducing metal stock which comprises working the metal cold in relatively short increments, compressing said increments by swaging devices and pushing said metal forward by said swaging devices while under such compression, whereby the metal is maintained in such condition that very substantial reductions can be made without the necessity of annealing.

61. The method of reducing metal stock which comprises working the metal cold in relatively short increments, compressing said increments by rolling devices, and pushing said metal forward by said rolling devices while under such compression, whereby the metal is maintained in such condition that very substantial reductions can be made without the necessity of annealing.

In testimony whereof, I have signed my name to this specification this 4th day of December 1931.

GEORGE EDWARD NEUBERTH.

CERTIFICATE OF CORRECTION.

Reissue Patent No. 18,329. Granted January 12, 1932, to

GEORGE EDWARD NEUBERTH.

It is hereby certified that error appears in the printed specification of the above numbered patent requiring correction as follows: Page 7, line 89, for the numeral ".005"" read .0005"; and that the said Letters Patent should be read with this correction therein that the same may conform to the record of the case in the Patent Office.

Signed and sealed this 1st day of March, A. D. 1932

M. J. Moore,
Acting Commissioner of Patents.

(Seal)